United States Patent
Nettesheim

(10) Patent No.: US 9,327,919 B2
(45) Date of Patent: May 3, 2016

(54) DEVICE AND METHOD FOR CONVEYING POWDER FROM A POWDER SUPPLY

(71) Applicant: Reinhausen Plasma GmbH, Regensburg (DE)

(72) Inventor: Stefan Nettesheim, Berlin (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 60 days.

(21) Appl. No.: 14/053,951

(22) Filed: Oct. 15, 2013

(65) Prior Publication Data

US 2014/0105694 A1   Apr. 17, 2014

Related U.S. Application Data

(63) Continuation of application No. PCT/EP2012/054340, filed on Mar. 13, 2012.

(30) Foreign Application Priority Data

Apr. 15, 2011 (DE) .......................... 10 2011 017 277
Aug. 5, 2011 (DE) .......................... 10 2011 052 431

(51) Int. Cl.
*B65G 53/40* (2006.01)
*B65G 53/24* (2006.01)
*B05B 7/14* (2006.01)
*B05B 12/08* (2006.01)

(52) U.S. Cl.
CPC ................ *B65G 53/24* (2013.01); *B05B 7/144* (2013.01); *B05B 7/1445* (2013.01); *B05B 12/081* (2013.01)

(58) Field of Classification Search
USPC ................................. 406/32, 75, 114, 115, 151
See application file for complete search history.

(56) References Cited

U.S. PATENT DOCUMENTS

| | | | |
|---|---|---|---|
| 3,951,462 A | 4/1976 | De Francisci | |
| 4,160,567 A * | 7/1979 | Merz | 406/89 |
| 4,812,086 A * | 3/1989 | Kopernicky | 406/153 |
| 5,006,018 A * | 4/1991 | Depew | B65G 53/24 406/152 |
| 5,116,321 A | 5/1992 | Gelain | |
| 5,273,584 A | 12/1993 | Keller | |
| 5,636,921 A | 6/1997 | Murata et al. | |
| 5,709,506 A * | 1/1998 | Beard et al. | 406/1 |
| 5,816,509 A | 10/1998 | Ahn et al. | |
| 6,447,215 B1 * | 9/2002 | Wellmar | 406/11 |
| 7,144,203 B2 * | 12/2006 | Gerber | 406/14 |
| 8,147,169 B1 * | 4/2012 | Kvalheim | 406/109 |
| 8,162,570 B2 | 4/2012 | Mauchle et al. | |
| 8,231,310 B2 | 7/2012 | Sanwald | |
| 8,491,228 B2 * | 7/2013 | Snowdon | B01J 8/0025 406/14 |

(Continued)

FOREIGN PATENT DOCUMENTS

| | | |
|---|---|---|
| CN | 101332452 | 12/2008 |
| DE | 4012190 A1 | 10/1991 |

(Continued)

*Primary Examiner* — Joseph Dillon, Jr.
(74) *Attorney, Agent, or Firm* — Simpson & Simpson, PLLC

(57) ABSTRACT

The invention relates to a device and a method for conveying powder. A container is provided for the powder, where the powder defines a surface in the container. A suction means has a suction opening for sucking in the powder from the surface. A moving means serves for producing a relative movement between the suction opening and the surface of the powder. During the relative movement, the powder is sucked in, a speed of the relative movement being variable in such a way that there is a constant mass flow.

15 Claims, 5 Drawing Sheets

(56) References Cited

U.S. PATENT DOCUMENTS

| | | | |
|---|---|---|---|
| 2008/0152437 A1* | 6/2008 | Merritt | B05B 7/1472 406/39 |
| 2009/0001198 A1 | 1/2009 | Norimatsu | |

FOREIGN PATENT DOCUMENTS

| | | |
|---|---|---|
| DE | 4112268 C1 | 3/1992 |
| DE | 4114097 A1 | 11/1992 |
| DE | 4423197 A1 | 1/1996 |
| DE | 19545181 A1 | 9/1996 |
| DE | 102004024447 A1 | 12/2005 |
| DE | 102006002582 A1 | 8/2006 |
| DE | 102007005313 A1 | 8/2008 |
| DE | 102007007588 A1 | 8/2008 |
| JP | H0456130 A | 2/1992 |
| JP | H03-100222 | 11/1992 |
| JP | H10-511070 | 10/1998 |
| JP | 2001130743 A | 5/2001 |
| JP | 2007-319756 A | 12/2007 |
| JP | S52-74901 | 12/2009 |
| WO | 2008/082861 | 7/2008 |

* cited by examiner

US 9,327,919 B2

DEVICE AND METHOD FOR CONVEYING POWDER FROM A POWDER SUPPLY

CROSS-REFERENCE TO RELATED APPLICATIONS

This application is filed under 35 U.S.C. §120 and §365(c) as a continuation of International Patent Application PCT/EP2012/054340, filed Mar. 13, 2012, which application claims priority from German Patent Application No. 10 2011 017 277.7, filed Apr. 15, 2011, and German Patent Application No. 10 2011 052 431.2, filed Aug. 5, 2011, which applications are incorporated herein by reference in their entireties.

FIELD OF THE INVENTION

The invention relates to a device for conveying powder. The invention further relates to a method for conveying powder from a powder container.

BACKGROUND OF THE INVENTION

Powder conveyance devices and methods are employed, for example, for conveying dosed quantities of a fine-grained powder for plasma coating processes. To prevent a standstill of the powder conveyance device, powder deposits and agglomerations are to be avoided.

The conveyance of fine-grained powders with a particle size of less than 150 μm with known conveyor devices is subject to considerable restrictions regarding the accuracy of the mass flow of the powder conveyed. There is no technically ideal solution for particles with grain sizes below 20 μm and feed rates of less of than 10 g/min. Below this grain size, the adhesion forces between the powder particles increase considerably. The surface of the particles in relation to the volume increases steeply. A cube with an edge length of 1 cm has a surface of 0.006 m². The same volume stacked up with particles of five nanometers edge length has, however, a surface area of 2400 m². The steep increase in the surface adhesion forces impairs the conveyance of such small particles. Agglomeration of the powder/gas mixture can be avoided by continuously coupling energy into the powder, for example, by sustaining high flow speeds, which involve a high gas or air consumption. Yet, high gas volume streams are disadvantageous for many kinds of subsequent working processes, such as, for example, plasma-coating processes or laser-coating processes. Furthermore, powder conveyance under high gas volume streams requires application of more energy. Also, small quantities of fine powders cannot be dispersed in gas.

German Patent Application No. 44 23 197 A1 discloses a powder pump for the spray-coating of articles in a rod-type elongated shape. On a front side, the powder pump carries a powder inlet opening via which the powder is drawn from an upwardly open powder container. The powder is subsequently conveyed via an inner tube of the powder pump to a consumer. The powder conveyance itself is driven by generating a vacuum within the powder pump. The vacuum is generated by an injector nozzle arranged in the vicinity of the powder inlet opening.

German Patent Application No. 10 2006 002 582 A1 discloses a powder conveyor with a fluidizing unit. The fluidizing unit is arranged at the end of a powder inlet tube of the powder conveyor and blows in the suction region of the powder inlet tube fluidizing air into the powder supply such that the powder is fluidized. The fluidized powder can be more readily sucked and conveyed. The fluidizing unit is arranged above and concentrically with the powder inlet opening. As a result, a screen-shaped region of fluidized powder is formed around the intake opening. The powder conveyance is performed by means of a compressed air injector, which is connected to the end of the powder intake tube opposite to the fluidizing unit. By construction of the powder conveyor, no fluidization occurs directly below the powder inlet opening. While the annular fluidization enhances the sucking of the powder, the powder conveyance lacks in constancy regarding the amount of powder sucked over time. Furthermore, powder agglomerates are merely deficiently dissolved, and for the most part, sucking directly through the powder suction opening. Powder agglomerates may cause issues and malfunctions, especially so in subsequent coating processes that aim for coatings of constant layer thickness.

BRIEF SUMMARY OF THE INVENTION

It is the object of the invention is to provide a device for conveying powders such that the amount of the conveyed powder is constant over time.

This object is achieved by a device for conveying of powder having a container for the powder where the powder in the container defines a surface; a suction means with an suction opening for sucking the powder from the surface; and a motion means for producing a relative motion between the suction opening and the surface of the powder during sucking of the powder is provided, where a speed of the relative motion is variable such that a predetermined mass flow is maintained.

Another object of the invention is to provide a method for conveying powders such that the amount of the powder conveyed over time corresponds to a predetermined value.

The above object is achieved by a method for conveying powder, the method having following steps: sucking a powder through a suction opening of a suction means from a surface of the powder arranged within a container; generating a relative motion between the suction opening and the surface of the powder while sucking the powder; continuously measuring the weight of the powder within the container during aspiration of the powder and transferring the resulting measuring data to a measurement and control electronics; and setting a speed of the relative motion between the suction opening and the surface of the powder such that a predetermined mass flow (dM/dt) of the powder out of the container is achieved.

According to the invention, powder is being sucked exclusively from a surface of the powder that is stored in the container. Powder may also be sucked from or out of a cover layer of the powder, where the cover layer comprises the powder surface. For example, when sucking from lower powder layers of a powder supply consisting of fine-grained, non-flowable powders, cavities form that cannot be removed but by intensive action onto the surrounding powder supply. Those cavities cause the powder stream (and its mass flow rate) to be non-uniform during the powder conveyance. Moving means provide a relative motion between the suction opening of the suction means and the surface of the powder or of the cover layer of the powder during powder sucking. In this way, the mechanical energy is coupled into the powder that is required to prevent the formation of cavities within its cover layer. A moving means serves for driving a relative motion between the suction opening and the surface of the powder during powder sucking. A speed of this relative motion can be varied such that a predetermined mass flow of powder conveyed from a first working space to a second working space is maintained, thereby transporting the powder within the container to the substrate.

The choice of the powder sucking technique depends on the particular mass and grain size of the powder particles. In one embodiment, the suction means may be spaced apart from the surface of the powder. Alternatively, the suction means may be in contact with the surface of the powder. Also, as already described above, the suction means may protrude into the cover layer of the powder. The powder sucking within in the cover layer is, for example, carried out as close as possible to the powder surface. The distance between the suction opening of the suction means and the surface of the powder supply (preferably ranges from 1 mm to 10 mm. Sucking powder close from its surface ensures, also for fine-grained powders with particle sizes ranging from 0.01 µm to 100 µm, such that the trace in the cover layer formed by the suction means is or remains open towards the powder surface.

As already mentioned, it is also conceivable to guide the suction means (embodied, e.g., as a powder nozzle or a suction needle) in contact with the powder surface. When the powder to be conveyed is very light, the suction means may be guided without direct to contact to its powder surface. In such cases, the suction means is typically spaced and guided about 0.2 mm above the powder surface. Consequently, there is no direct mechanical contact between the suction means and the powder surface. By the sucking action, the powder is torn from the powder surface and transferred into the suction means.

The volume flow of the conveyed powder may be varied by adjusting the speed of the relative motion between the suction opening and the powder supply. Furthermore, the geometry of the suction means as well as of the diameter of its suction opening has a substantial impact on the volume flow of the powder it conveys. The preferred distance from the suction opening of the suction means to the surface of the powder supply also depends on the above-mentioned parameters. Higher volume flows permit increasing the distance from the suction opening, and thus, allows for sucking of powder layer of increasing thickness during the relative motion of the suction means in the cover layer.

Three-axle systems that allow for said relative motion of the suction means in the X-, Y- and Z-direction are feasible to embody the motion means. The X/Y motion is required in order to drive the horizontal relative motion between the suction opening and the powder surface or the powder within the cover layer, while the Z-axis permits the vertical adjustment of the suction opening in order to ensure a constant distance from the powder surface, a continuous contact to the powder surface or a constant immersion depth of the suction means into the cover layer. Tracking of the suction opening along the Z-axis is necessary when a powder layer has been entirely removed by the suction means.

The suction means has, for example, a needle-shaped, hollow cylindrical body with two end faces. One of these end faces forms the suction opening while the other end face is connected, for example, via a flexible suction line, to the suction side of a pump. Via pressure side this pump the powder is conveyed downstream to a subsequent process, for example, a plasma coating process.

The tracking of the suction opening in along the Z-axis of the powder supply may be automated by arranging a float gauge on the suction means at a distance from the suction opening. The float gauge is floating on the surface of the powder supply and thus adapts to its surface topography. The float ensures a constant distance between the suction opening and the powder surface within the cover layer.

Setting a pressure difference between the first working space and the second working space serves to convey the powder from the surface of the powder in the container to a surface of a substrate. One possible means for setting this pressure difference is a diaphragm pump.

The powder is to be conveyed in such a diaphragm pump separated from its drive by its membrane. By virtue of this separating membrane, the drive is protected from the harmful influences, especially caused by the fine-grained powders. Conversely, the fine-grained powder is separated from the drive und is thus warded against possible detrimental influences stemming, for example, from lubricants of the drive. The membrane is, for example, deflected pneumatically or mechanically. For conveying fine powders, the oscillation frequency of the membrane ranges, for example, from 10 Hz to 200 Hz for pump volumes ranging from 0.1 mL to 20 mL.

An undesirable pulsation in the powder within the pressure line may be avoided or at least reduced by connecting the suction means to at least two diaphragm pumps that are set up for phase-shifted operation. The high frequencies of the diaphragm pump enhance the continuous conveyance of small amounts of the fine-grained powder. For enhanced continuous and low-pulsation conveyance of fine powders, it is advantageous to connect the suction side of each diaphragm pump to the suction means via an as short as possible suction line. Suitable lengths of the suction line have been found to range from 1 cm to 50 cm. Also, the length of the pressure line should preferably be at least a factor of 10 than the suction line for enhanced low-pulsation conveyance. In tests with suction lines and pressure tines with an inner diameter of 2.5 mm, no low-pulsation conveyance was obtained for a pressure line length of 3 in, while good results have been achieved with pressure line lengths of more than 10 m. In these tests, the length of the suction line ranged from 0.5 m to 1 m. It could be concluded from these tests that the conveyance of fine powders is uniform and low in pulsation if each diaphragm pump is connected on its pressure side to a pressure line, and if the length of these pressure lines exceeds their diameter at least by a factor of 2000.

In order to prevent powder deposits in the conveying path, the suction means and/or the suction lines and/or the pressure lines of the device are coupled to, for example, a vibration generator. In case the suction means is coupled to a vibration generator, the powder near the powder surface or in the cover layer is loosened up in the vicinity of the suction opening and powder agglomerates are dissolved before being sucked into the suction means.

A superimposed oscillatory motion performed by the suction means, such as, e.g., a circular oscillation, achieves several beneficial effects regarding the quantity of powder sucked and conveyed. As the powder surface is smoothened, the constancy of the powder's mass flow rate according to predetermined mass flow rate can be maintained. Also, the surface swept by the suction means per time unit is increased by an oscillatory motion, thus, averaging out possible discontinuities in the topography of the powder surface. Both effects allow for maintaining a continuous, predetermined powder feed rate (i.e., a predetermined mass flow).

Amongst vibration generators used are, e.g., mechanical or piezo oscillators.

The conveyance of fine-grained powders can be improved by fluidizing the powder sucked into the suction means and/or the suction means downstream lines by injecting a gas. This fluidizing gas is injected in particular with low volume flows ranging from of 1 L/min to 50 min.

For enhanced fluidization of the powder, the suction means my be embodied by a hollow needle. An inner hollow needle acts as a suction means, while the fluidizing gas is supplied via an outer hollow needle that surrounds the inner hollow needle.

In order to ensure that a predetermined mass flow of powder is maintained from the container to the substrate the container is arranged on a scale. This scale is connected with a measuring and control electronics that controls the motion means or the multi-axle system such that, by adjusting the speed of the relative motion of the suction means, the predetermined mass flow of powder from the surface of the powder to the surface of the substrate is adjusted or maintained.

The horizontal relative motion in the cover layer is carried out by the motion means in a circular manner. To level out the topography of powder surface, a device for leveling the powder surface may be provided. This leveling device can be, for example, a rake that moves relative to the powder surface and shoves powder into the track in the cover layer left behind by the suction means from adjacent regions. As a result, after a circular relative motion of 360° only little tracking of the suction means is required along the Z-axis.

If the horizontal relative motion carried out by the motion means has a helical in the cover layer, an entire powder layer may be removed from the entire surface of the powder supply without mechanical action onto regions neighboring the trace generated by the suction means.

The method for conveying powder, having the following steps: sucking a powder through a suction opening of a suction means from a surface of the powder arranged within a container; generating a relative motion between the suction opening and the surface of the powder while sucking the powder; continuously measuring the weight of the powder within the container while sucking the powder and transferring the resulting measuring data to a measurement and control electronics; and setting a speed of the relative motion between the suction opening and the surface of the powder such that a predetermined mass flow of the powder from the container is achieved.

BRIEF DESCRIPTION OF THE DRAWINGS

The nature and mode of operation of the present invention will now be more fully described in the following detailed description of the invention taken with the accompanying drawing figures, in which:

FIG. 4b is a plan view of the device shown in FIG. 4a; and,

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
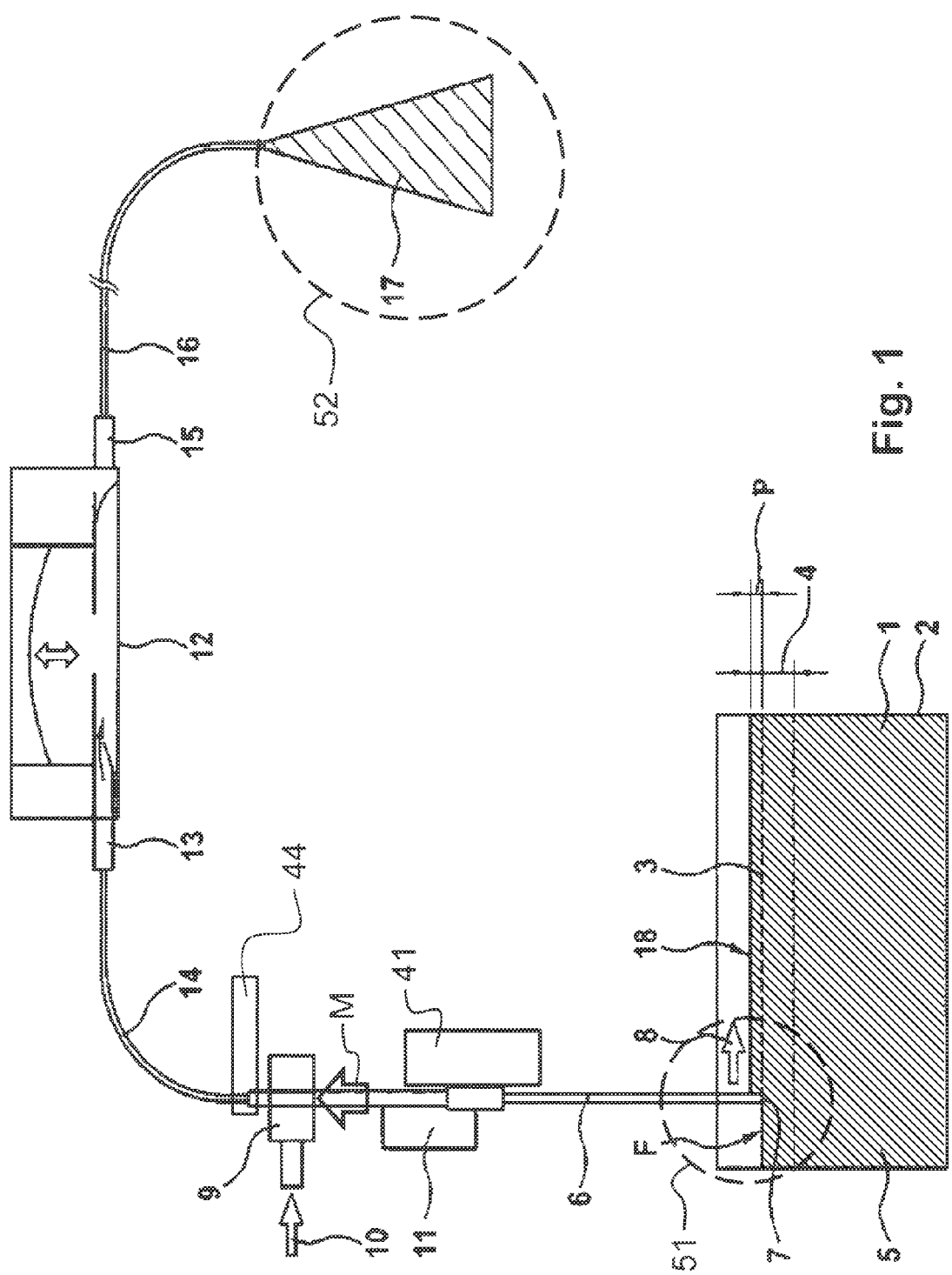
FIG. 1 is a schematic side view of an inventive device for conveying of fine-grained powders.

FIG. 1 shows a device for conveying fine-grained, non-flowable powders 1 with particle sizes ranging from 0.01 µm to 100 µm. Powder 1 is stored in container 2. Powder supply has cover layer 3 having a constant thickness 4 of 20 mm which is not represented to scale in FIG. 1. Beneath cover layer 3 or surface 18 of powder 1, there is lower layer 5 of the powder supply, whose thickness, at the beginning of the sucking of powder 1 from the powder supply, is multiple times greater than thickness 4 of cover layer 3.

The device further includes suction means 6 with suction opening 7 for sucking powder 1 out of container 2. In one embodiment, suction means 6 is designed as a hollow needle. The hollow needle is arranged on multi-axle system 41 acting as motion means 44 for driving relative motion 8 in the X-direction X and Y-direction Y between suction opening 7 and powder 1 within cover layer 3. It is likewise conceivable that suction opening 7 of suction means 6 is guided at a distance of 0 mm or with a small spacing from surface 18 of powder 1. It is feasible to space suction opening 7 at a distance above surface 18 of powder 1 when the particles of powder 1 are light enough to be easily transported from first working chamber 51, in which surface 18 of powder 1 is located, to second working chamber 52, in which surface 35 of substrate 36 (see FIG. 2) is arranged. Between surface 18 of powder 1 and surface 35 of substrate 36, there is pressure difference Δp. In this case, the particles of powder 1 are sucked from surface 18.

At the opposite end of suction opening 7, gas supply 9 for supplying fluidizing gas 10 in mass flow dM/dt of powder 1 is arranged on suction means 6. Furthermore, mechanical vibration generator 11 is arranged on suction means 6. This mechanical vibration generator 11 dissolves particle agglomerations in powder 1 passing through suction means 6 and also loosens up powder 1 at surface 18 or in cover layer 3 in the region of suction opening 7.

A means for adjusting pressure difference Δp between surface 18 of powder 1 and surface 35 of substrate 36 and between first working chamber 51 and second working chamber 52 is, for instance, diaphragm pump 12. In this embodiment, suction side 13 of diaphragm pump 12 is connected to suction means 6 via suction line 14. On pressure side 15 of diaphragm pump 12, pressure line 16 is connected. This pressure line 16 leads, e.g., to plasma coating device 17 not shown in FIG. 1. Its function and operation are illustrated in greater detail in FIG. 2 and pertaining description.

By means of multi-axle system 41 not shown in FIG. 1, relative motion 8 between suction opening 7 and the powder supply in cover layer 3 and with respect to the surface, respectively, is carried out during the sucking of powder 1 driven by diaphragm pump 12. The immersion depth of suction opening 7 ranges between 1 mm to 10 mm throughout its horizontal motion through cover layer 3.

The device shown in FIG. 1 can include several suction means 6 that are simultaneously moved relative to the powder supply and within cover layer 3 or in relation to surface 18 of powder 1 by means of one or multiple multi-axle systems 41. Multi-axle system 41 for generating relative motion 8 may, for example, be embodied by a portal system or a robot arm of a robot.

Figure 2:
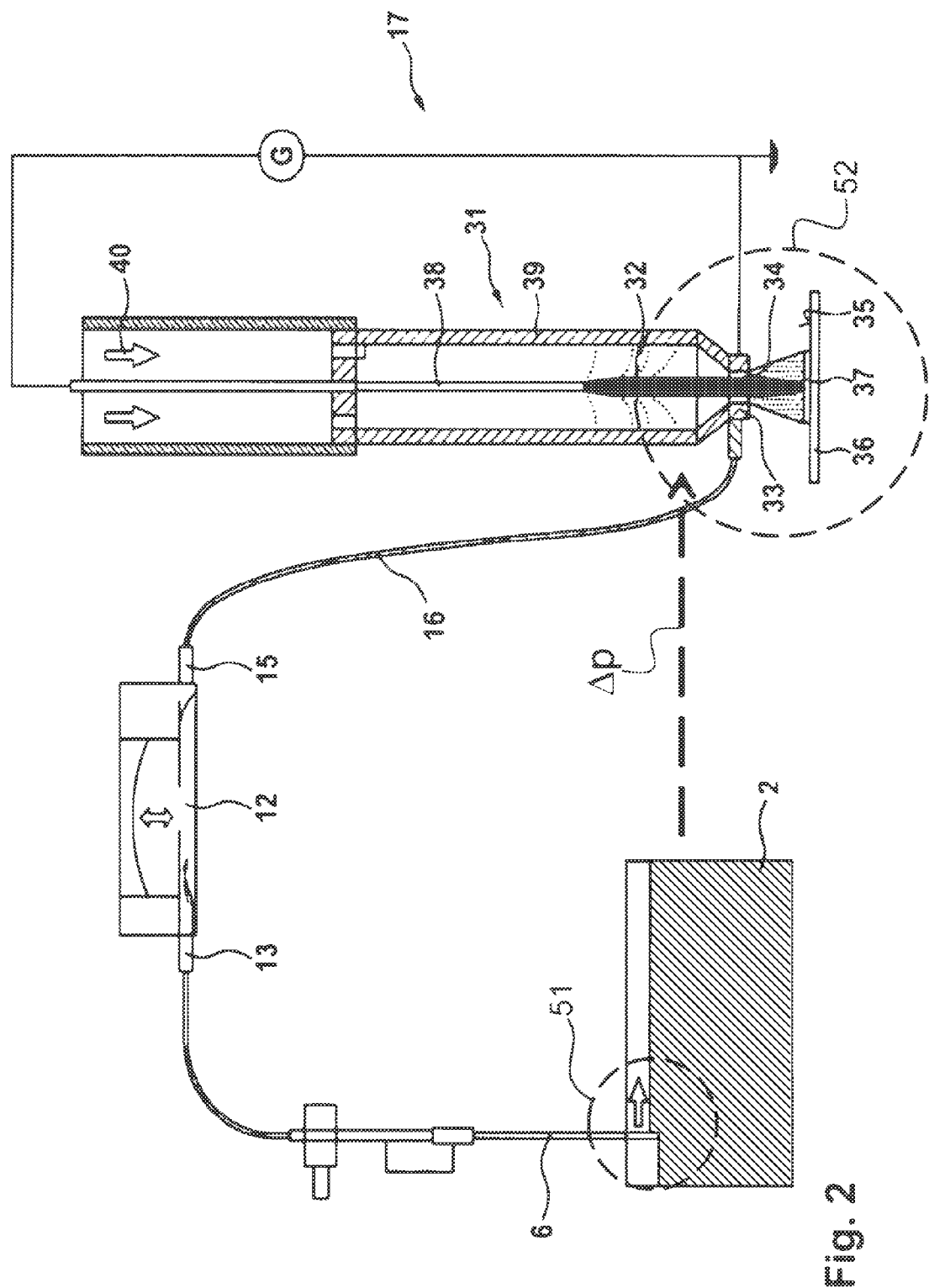
FIG. 2 shows the device according to FIG. 1 for conveying fine-grained powder to a plasma-coating system.
Figure 3A:
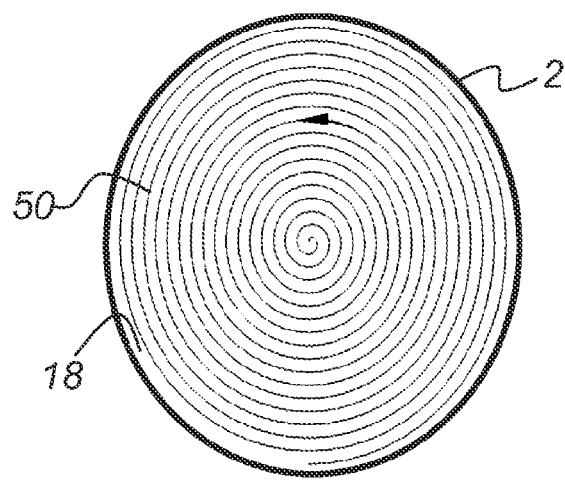
FIG. 3a shows a representation of a helical motion of the suction means relative to the surface of the powder supply.
Figure 3B:
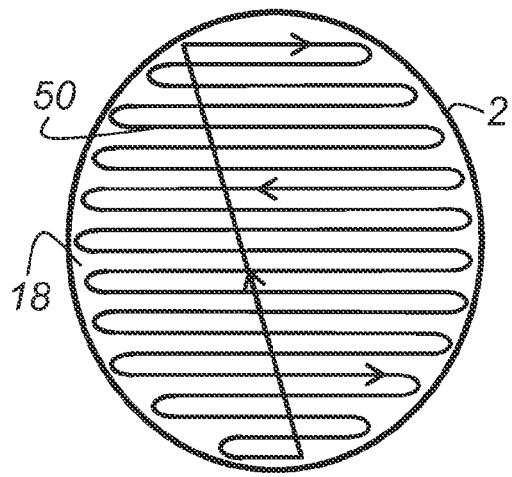
FIG. 3b shows a representation of a meander-shaped motion of the suction means relative to the surface of the powder supply.
Figure 3C:
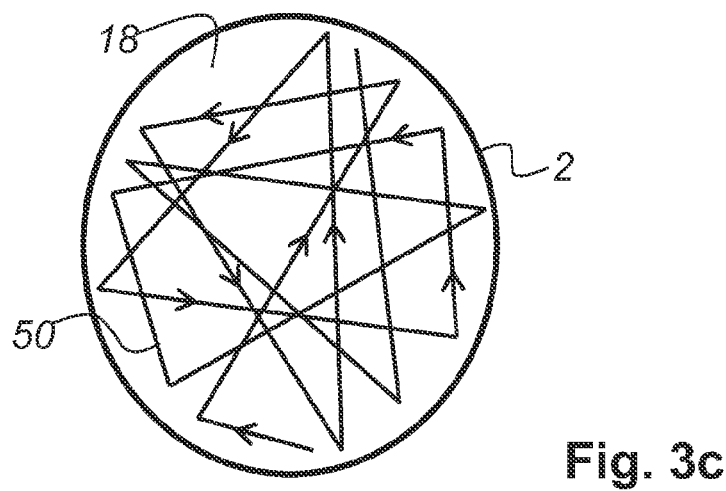
FIG. 3c shows a representation of a linear motion of the suction means relative to the surface of the powder supply.

Multi-axle system 41 can perform, for instance, relative motions 8 between suction means 6 and surface 18 of powder 1 as shown in FIGS. 3a to 3c. In order to suck complete powder layer P (see FIG. 1) over entire surface 18 of powder 1, relative motion 8 is composed of a superposition of linear horizontal motion components in the X-direction X and Y-direction Y, as can be seen from the top-view representations of FIGS. 3a to 3c. The removal of powder layer P exposes new surface F, which then forms surface 18 of the powder supply. Suction opening 7 is tracked in Z-direction by means of multi-axle system 41 in order to position suction opening 7 in new cover layer 3 upwardly limited by new surface 18 (cf. FIG. 1). Subsequently, suction means 6 sucks fine-grained powder 1 from new cover layer 3 in proximity to its surface. How suction means 6 may be spaced from or immersed in powder 1 has been laid out above in detail. Although FIGS. 1 and 2 illustrate an immersion of suction means 6 into powder 1, this shall not be regarded as a limitation of the invention.

FIG. 3a shows horizontal helical relative motion 8 within cover layer 3 or with respect to surface 18 of powder 1, which may also be generated by suitably controlled multi-axle system 41. FIG. 3b shows horizontal meander-shaped relative motion 8 within cover layer 3 or with respect to surface 18 of powder 1. FIG. 3c shows horizontal linear relative motion 8 within a cover layer or with respect to surface 18 of powder 1 which is composed of plurality of straight trajectories 50. All possible trajectories 50 are tracked in the Z-direction Z.

Figure 4A:
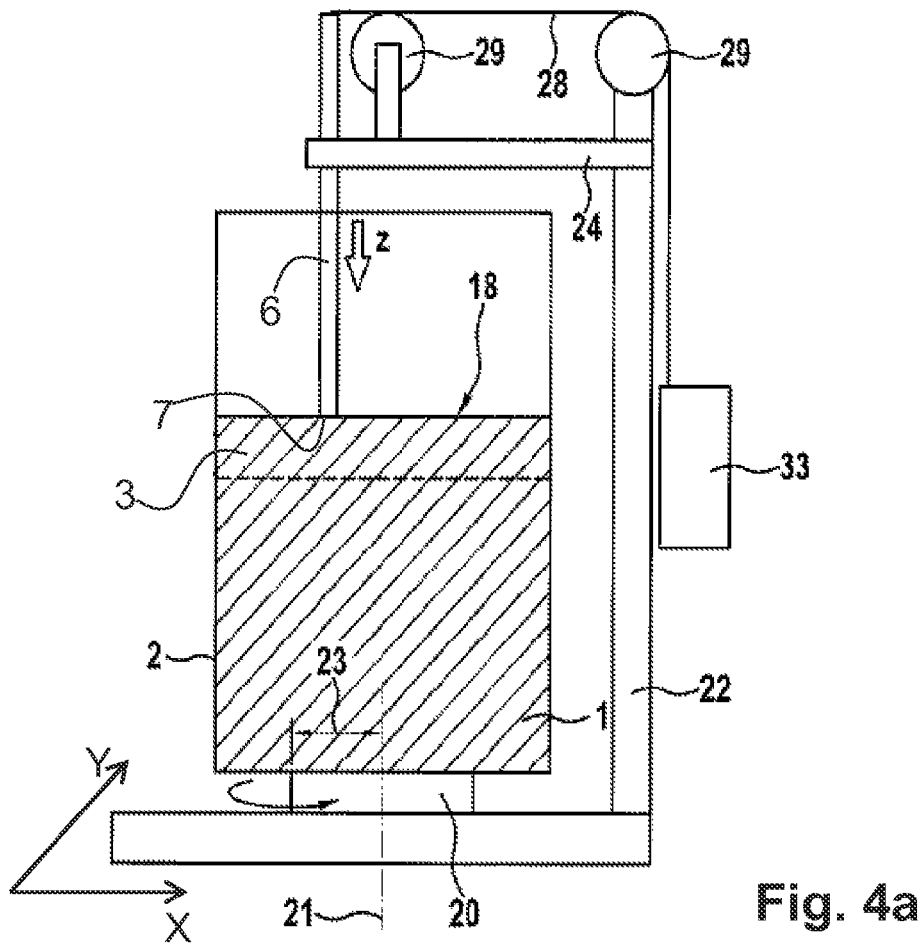
FIG. 4a is a schematic side view of another embodiment the inventive device performing a circular motion of the suction means relative to the surface of the powder supply.
Figure 4B:
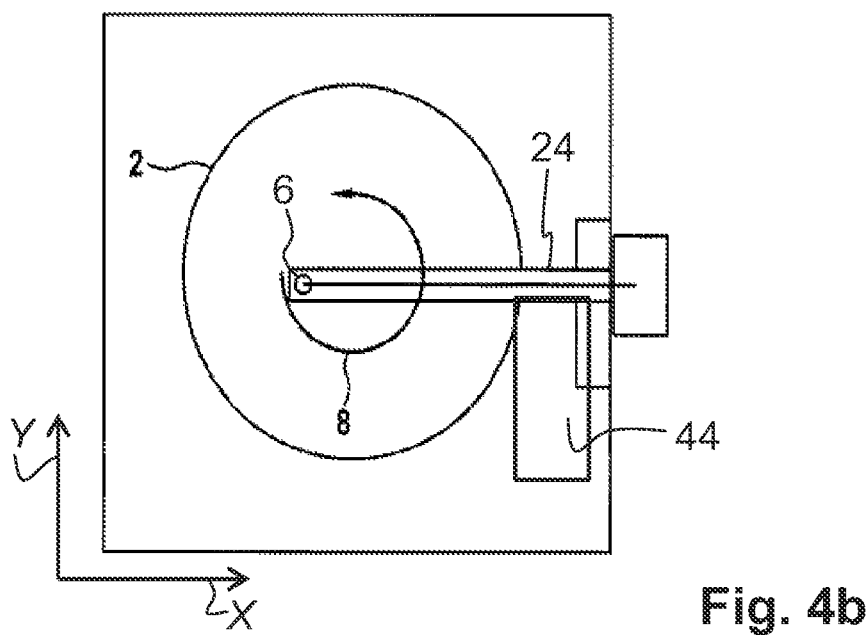

FIGS. 4a and 4b show an additional embodiment, which performs circular relative motion 8 (having superimposed motion components in X-direction X and the Y-direction Y) of suction means 6 relative to surface 18 of powder 1 in container 2. Features of this embodiment corresponding to those shown in FIG. 1 carry consistent reference numerals and have already been described in this context.

The here illustrated embodiment has rotary drive 20, by means of which cylindrical container 2 can rotated about its axis of rotation 21. In most cases, however, rotary to drive 20 can be omitted.

The in Z-direction Z height-adjustable suction means 6 is arranged on horizontal cantilever 24 of frame 22. Suction opening 7 faces in the direction of surface 18 of powder 1 and can protrude into cover layer 3 or, as shown in FIG. 4a, merely touch surface 18 of powder 1.

Also in the case of the embodiment shown in FIGS. 4a and 4b, suction means 6 may be tracked in Z-direction Z by an associated motion means 44.

FIG. 2 illustrates an embodiment of the invention. Pressure side 15 of diaphragm pump 12 is connected via pressure line 16 to beam generator 31 for generating bundled plasma beam 32 by arc discharge. The powder/gas mixture is injected via nozzle 33 into plasma beam 32 in a region of feed-in of outlet 34 of beam generator 31. Fine-grained powder 1 is deposited with plasma beam 32 as coating 37 onto surface 35 of substrate 36. Beam generator 31 has inner rod-shaped electrode 38 for the generation of plasma beam 32. Inner rod-shaped electrode 38 is surrounded and electrically insulated against jacket electrode 39. Working gas 40 streams through jacket electrode 39 from the opening located opposite to nozzle 33.

The distance between suction opening 7 to surface 18 of powder 1 inside of cover layer 3 or with respect to surface 18 of powder 1 may be adjusted by means of multi-axle system 41 which is also drivable in Z-direction.

Figure 5:
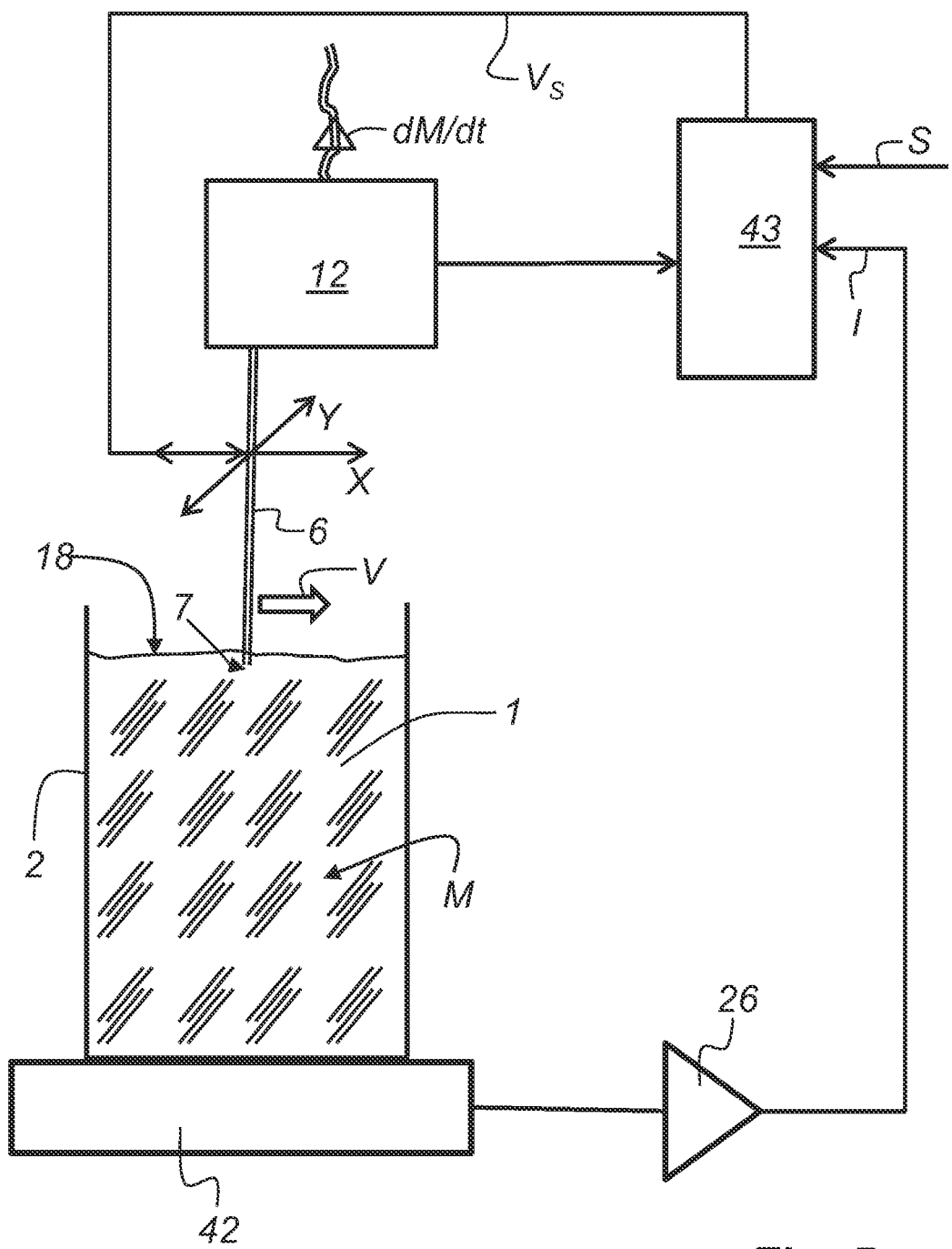
FIG. 5 is a schematic representation of a control loop for setting a temporal predetermined mass flow of the powder conveyed by the suction means.

FIG. 5 shows schematic arrangement 23 by which predetermined mass flow dNl1dt of powder 1, conveyed by suction means 6, can be adjusted. Container 2 containing powder 1 stands on scale 42. By continuous weighing of mass M of powder 1 in the container during the sucking of powder 1, the amount of powder 1 extracted per unit time can be determined. The measurement data obtained by the scale are subsequently communicated to measurement and control electronics 43. Between scale 42 and measurement and control electronics 43, operation amplifier 26 is provided. Scale 42 is connected to measurement and control electronics 43, which is connected multi-axle system 41 such that on velocity V of relative motion 8 can be controlled such that predetermined mass flow dM/dt of powder 1 from its surface 18 to surface 35 of substrate 36 is maintained. Measurement and control electronics 43 receives time-resolved actual value I of mass flow dM/dt (first derivative of conveyed mass M with respect to time T). The change in mass flow $d^2M/dt^2$ is the second derivative of conveyed mass M with respect to time T. Measurement and control electronics 43 carries out a comparison between actual value I and set value S. The diaphragm pump also supplies information on its status to measurement and control electronics 43. Control quantity $V_s$ for speed V of relative motion 8 is derived from the comparison between actual value I and set value S.

Determined control quantity $V_s$ serves for the control and regulation of motion means 44 driving relative motion 8 between suction means 6 or suction opening 7 and surface 18 of powder 1 while the sucking of powder 1 remains uninterrupted. Based on the value of control quantity $V_s$, speed V of relative motion 8 is adjusted such that temporally predetermined mass flow dM/dt is being maintained.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

| \multicolumn{2}{c}{List of reference numbers} ||
| No. | Description |
| --- | --- |
| 1 | powder |
| 2 | container |
| 3 | cover layer |
| 4 | thickness |
| 5 | lower layer |
| 6 | suction means |
| 7 | suction opening |
| 8 | relative motion |
| 9 | gas inlet |
| 10 | fluidizing gas |
| 11 | vibration generator |
| 12 | diaphragm pump |
| 13 | suction side |
| 14 | suction line |
| 15 | pressure side |
| 16 | pressure line |

-continued

List of reference numbers

| No. | Description |
|---|---|
| 17 | palsma coating system |
| 18 | surface |
| 19 | surface |
| 10 | pressure drive |
| 21 | rotation axis |
| 22 | frame |
| 23 | arrangement |
| 24 | cantilever |
| 26 | operation amplifier |
| 27 | segment |
| 28 | rope |
| 29 | pulley |
| 30 | counterweight |
| 31 | beam generator |
| 32 | plasma beam |
| 33 | nozzle |
| 34 | outlet |
| 35 | surface |
| 36 | substrate |
| 37 | coating |
| 38 | rod-shaped electrode |
| 39 | jacket electrode |
| 40 | working gas |
| 41 | multi-axle system |
| 42 | scale |
| 43 | measurement and control electronics |
| 44 | motion means |
| 50 | trajectory |
| 51 | first working space |
| 52 | second working space |
| I | actual value |
| M | mass |
| $M_T$ | temporal change of the mass |
| dM/dt | mass flow |
| $d^2M/dt^2$ | change in the mass flow |
| P, F | powder layer |
| Δp | pressure difference |
| S | set value |
| V | speed |
| $V_S$ | control quantity |
| X | X-direction |
| Y | Y-direction |
| Z | Z-direction |

What is claimed is:

1. A device for conveying of powder, comprising:
a container in which the powder is stored;
a surface in the container defined by the powder;
a suction means spaced from the surface of the powder;
a suction opening defined by the suction means for sucking the powder from the surface;
a motion means for producing a relative motion between the suction opening and the surface of the powder during sucking of the powder from the surface, wherein a speed of the relative motion is variable such that a predetermined mass flow is maintained; and,
a scale for the container with the powder, wherein the scale is connected to measurement and control electronics for controlling the motion means such that the predetermined mass flow of the powder from the surface of the powder to a surface of a substrate is maintainable via the speed of the relative motion.

2. The device as recited in claim 1, wherein the suction means dips into a cover layer of the powder.

3. The device as recited in claim 1, wherein the motion means comprises a multi-axle system for driving the relative motion between the suction opening and the surface of the powder.

4. The device as recited in claim 1, wherein the suction means has a hollow cylindrical body having two front sides, wherein one of the front sides forms the suction opening.

5. The device as recited in claim 1, wherein a pressure difference between the surface of the powder in a first working space and a surface of a substrate in a second working space is maintainable, whereby the powder is conveyable to the second working space.

6. The device as recited in claim 5, wherein there is at least one diaphragm pump for generating the pressure difference.

7. The device as recited in claim 1, wherein the suction means and/or a suction line and a pressure line are connected with a vibration generator.

8. The device as recited in claim 1, wherein the suction means comprises a gas inlet for a fluidizing gas.

9. The device as recited in claim 1, wherein the container is arranged on a scale, the scale being connected to a measurement and control electronics for controlling a multi-axle system such that the predetermined mass flow of the powder from the surface of the powder to the surface of the substrate is maintainable via the speed of the relative motion.

10. A device for conveying of powder comprising:
a container in which the powder is stored;
a surface in the container defined by the powder;
a suction means;
a suction opening, defined by the suction means, for sucking the powder from the surface, wherein the suction opening of the suction means is spaced from the surface of the powder in the container;
a motion means is provided for producing a relative motion between the suction opening and the surface of the powder during sucking of the powder, wherein a speed of the relative motion is variable such that a predetermined mass flow is maintained; and,
a scale for the container with the powder, wherein the scale being connected to a measurement and control electronics for controlling a multi-axle system such that the predetermined mass flow of the powder from the surface of the powder to a surface of a substrate is maintainable via the speed of the relative motion.

11. A device for conveying of powder comprising:
a container for the powder wherein the powder in the container defines a surface;
a suction means with an suction opening for sucking the powder from the surface, wherein suction means dips into a cover layer of the powder;
a motion means for producing a relative motion between the suction opening and the surface of the powder during sucking of the powder is provided, wherein a speed of the relative motion is variable such that a predetermined mass flow is maintained; and,
a scale for supporting the container, wherein the scale being connected to a measurement and control electronics for controlling a multi-axle system such that the predetermined mass flow of the powder from the surface of the powder to the surface of the substrate is maintainable via the speed of the relative motion.

12. The device as recited in claim 1, wherein the suction means and/or a suction line or a pressure line are connected with a vibration generator.

13. A device for conveying of powder comprising:
a container in which the powder is stored;
s surface in the container defined by the powder;
a suction means touching the surface of the powder in the container;
a suction opening defined by the suction means for sucking the powder from the surface;

a motion means for producing a relative motion between the suction opening and the surface of the powder during sucking of the powder, wherein a speed of the relative motion is variable such that a predetermined mass flow is maintained; and
  a scale for the container with the powder, wherein the scale is connected to measurement and control electronics for controlling the motion means such that the predetermined mass flow of the powder from the surface of the powder to a surface of a substrate is maintainable via the speed of the relative motion.

14. The device as recited in claim 13, wherein the suction means and/or a suction line and a pressure line are connected with a vibration generator.

15. The device as recited in claim 13, wherein the suction means and/or a suction line or a pressure line are connected with a vibration generator.

\* \* \* \* \*